United States Patent [19]

Lescoffit

[11] Patent Number: 4,572,265
[45] Date of Patent: Feb. 25, 1986

[54] SINGLE-PIECE RIM HAVING TIRE MOUNTING NOTCH, AND METHOD OF MOUNTING THE TIRE THEREON

[75] Inventor: Claude Lescoffit, Chamalieres, France

[73] Assignee: Compagnie Generale des Etablissements Michelin, France

[21] Appl. No.: 637,519

[22] Filed: Aug. 3, 1984

[30] Foreign Application Priority Data

Sep. 15, 1983 [FR] France .................................. 83 14819

[51] Int. Cl.⁴ .......................... B60B 21/10; B60C 5/00
[52] U.S. Cl. .................................. 152/379.3; 152/381.4
[58] Field of Search .................. 152/375, 379.3, 379.5, 152/381.4

[56] References Cited

U.S. PATENT DOCUMENTS

| | | |
|---|---|---|
| 612,229 | 10/1898 | Barlow . |
| 2,198,978 | 4/1940 | Sauer . |
| 3,212,548 | 10/1965 | Drazin . |
| 3,664,405 | 5/1972 | Poyner ................................ 152/375 |
| 3,674,080 | 7/1972 | Verdier ............................... 152/375 |
| 4,151,870 | 5/1979 | Watts .................................. 152/375 |

FOREIGN PATENT DOCUMENTS 2853633  6/1979  Fed. Rep. of Germany ... 152/381.4

Primary Examiner—David A. Scherbel
Attorney, Agent, or Firm—Brumbaugh, Graves, Donohue & Raymond

[57] ABSTRACT

The rim has at least one stop which may be of great height, provided with a notch which is so shaped and oriented that the tire bead can be mounted from the mounting well up to its seat by relative rotation of the tire and the rim.

7 Claims, 4 Drawing Figures

SINGLE-PIECE RIM HAVING TIRE MOUNTING NOTCH, AND METHOD OF MOUNTING THE TIRE THEREON

The present invention relates to single-piece rims intended to receive pneumatic tires, particularly rims, the profile of which is designed to retain the tire bead on its seat. It also relates to the method of mounting a tire on such a rim.

As is known, a single-piece rim necessarily has a mounting well to permit the mounting of the tire, as well as two seats on which the beads of the tire place themselves and are wedged under the effect of the inflation pressure. On the outside, each seat is extended by a rim flange which is directed away from the axis of the wheel. Ordinarily the seats are inclined with respect to the axis of rotation of the wheel by an angle (called the conicity) of 5° in passenger cars and 15° in heavy vehicles. The rim flanges are of variable shape and height. They participate, with the conicity, in the positioning and outer retention of the beads of the pneumatic tire.

When a transverse force is applied to the tire, due for instance to centrifugal force upon a turn taken at high speed, a dislodgement may occur: a bead which is on the outside of the turn leaves its seat, is pushed towards the interior of the rim during its passage between the route and the rim since the transverse force of reaction to the centrifugal force is not compensated for by the force resulting from the inflation pressure. The bead runs the risk of leaving its seat in such a way that it may fall into the mounting well of the rim. At that time, the other bead of the tire may pass over the flange of the rim and the tire leaves the rim.

Various means directed at improving the resistance to unwedging by the selection of a suitable shape of the rim are known. One of these means consists in retaining the bead on the inner side of the rim by a stop, commonly referred to as a "hump". The use of such humps is furthermore general in the case of passenger car tires which are mounted without inner tube. These humps are of standardized shapes.

The effectiveness of such humps, although substantial, is at times insufficient.

A bead is relatively rigid due to the presence of one or more bead rings sometimes consisting of cabled reinforcements or of rubber of high modulus. This rigidity is necessary in order to attach the tire firmly to its rim. This rigidity limits the possibility of radial expansion of the base of the bead and, therefore, it limits the height of the hump which permits easy mounting of the tire. The full effectiveness of the humps is jeopardized thereby.

Other methods for preventing the dislodgement of the beads have been proposed, in particular in French published application No. 2,378,643 and in French published application No. 2,471,290. However, these proposals require the use of tires having special beads. In French published application No. 2,378,643, the bead must have a point of rubber and in French published application No. 2,471,290 the bead must be of large conicity, which is a function of the height of the hump. There are thus concerned in each case tire assemblies comprising a special rim requiring the mounting of a special tire.

The object of the present invention is a rim which can retain the tire bead on its seat in reliable manner, that is to say even when traveling flat.

The invention is independent of the mounting seat proper, its conicity and dimensions and is independent of the shape and constitution of the bead of the tire.

This result will be obtained by providing, between at least one of the two seats and the mounting well, a stop of a height greater than the height of a conventional hump. In this stop a notch of special shape must be provided which permits the mounting of the tire in accordance with a special method.

The rim of the invention has a mounting well located between two seats on each of which a tire bead is to be mounted, each seat being extended axially towards the outside of the rim by a rim flange which extends radially and axially towards the outside of the rim, the rim flange forming an outer stop and axially positioning the tire bead; the rim is provided, between at least one of the two seats and the mounting well, with a stop for the axial retaining of the tire bead spaced from the rim flange by a width at least equal to the width of the tire bead, the stop being provided with at least one notch; the rim is characterized by the fact that the notch has a width at least equal to the width of the tire bead, the notch is oriented at an angle $\alpha$ of between 10° and 90° with respect to the circumferential direction of the rim, and the notch is such that the rim radius measured at the outer surface of the rim at the place of the notch is always at most equal to the rim radius measured at the axially inner edge of the seat and is therefore shaped in such a manner that it can receive the tire bead and guide it from the mounting well up to its seat when the mounting is effected by relative rotation of the tire and the rim, with due consideration of the width between the stop and the rim flange.

The method of mounting therefore consists in "screwing" the tire bead onto the seat. One proceeds in the following manner: The bead is engaged on the notch and on the seat, which is done easily and without deformation by utilizing the mounting well, as in for passing over a rim flange; then, by relative rotation of the tire and of the rim (or stated differently, by "screwing"), the tire bead gradually leaves the mounting well and places itself on its seat. For final mounting, the tire bead must pass over the stop by stretching; this final movement is effected either by rotation of the tire on the rim or by mounting under pressure. The removal is effected in the following manner: The removal tools (levers, etc.) are used to push the tire bead back at the place of the notch. The tire bead is then pushed back at another place close to the first away from the notch. The tire bead then passes over the stop and falls into the mounting well and the final removal is effected in conventional manner.

This mounting technique minimizes the deformation of the tire bead necessary in order for it to pass over a stop of a given outside diameter. In fact, the tire bead need not stretch radially at all the points of the circumference at the same time; it is not necessary that it stretch to the maximum outside diameter of the stop or to a practically equivalent diameter. By the mounting in accordance with the invention on a rim according to the invention it is sufficient that the tire bead deform radially to a size measured as a diameter but included between the top of the stop and the bottom of the adjacent seat.

It is due to the demultiplication effect of the screw mounting technique that one succeeds in forcing the bead to pass over a stop of great height.

The invention will be better understood by reference to the drawings which describe two special illustrative but non-limitative embodiments of rims in accordance with the invention.

Figure 3:
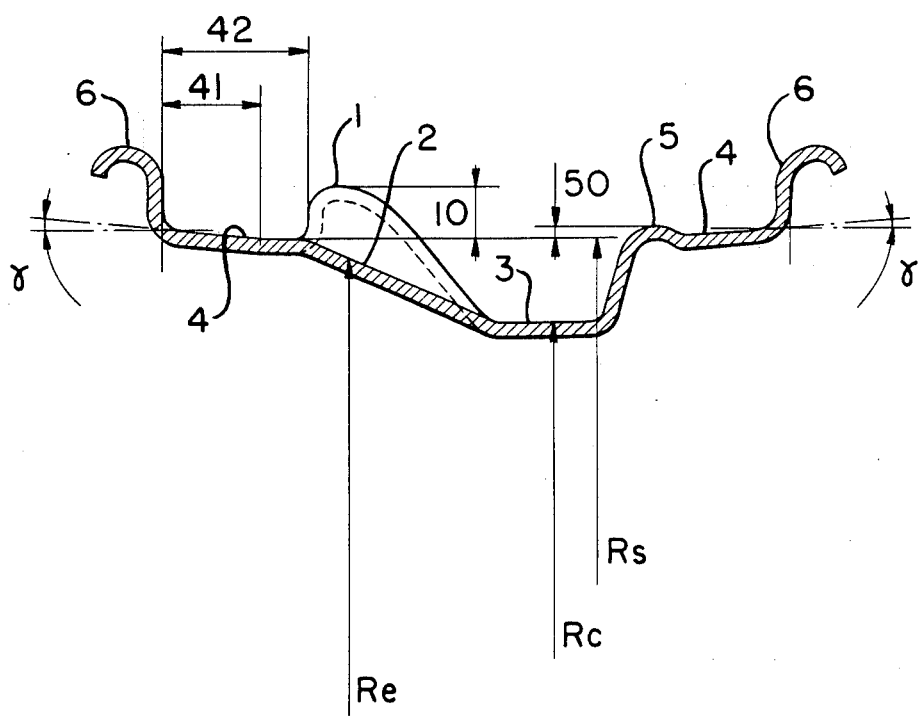
FIG. 3 is a section along the line III—III of FIG. 2 and therefore is a profile view of a rim according to the invention.
Figure 2:
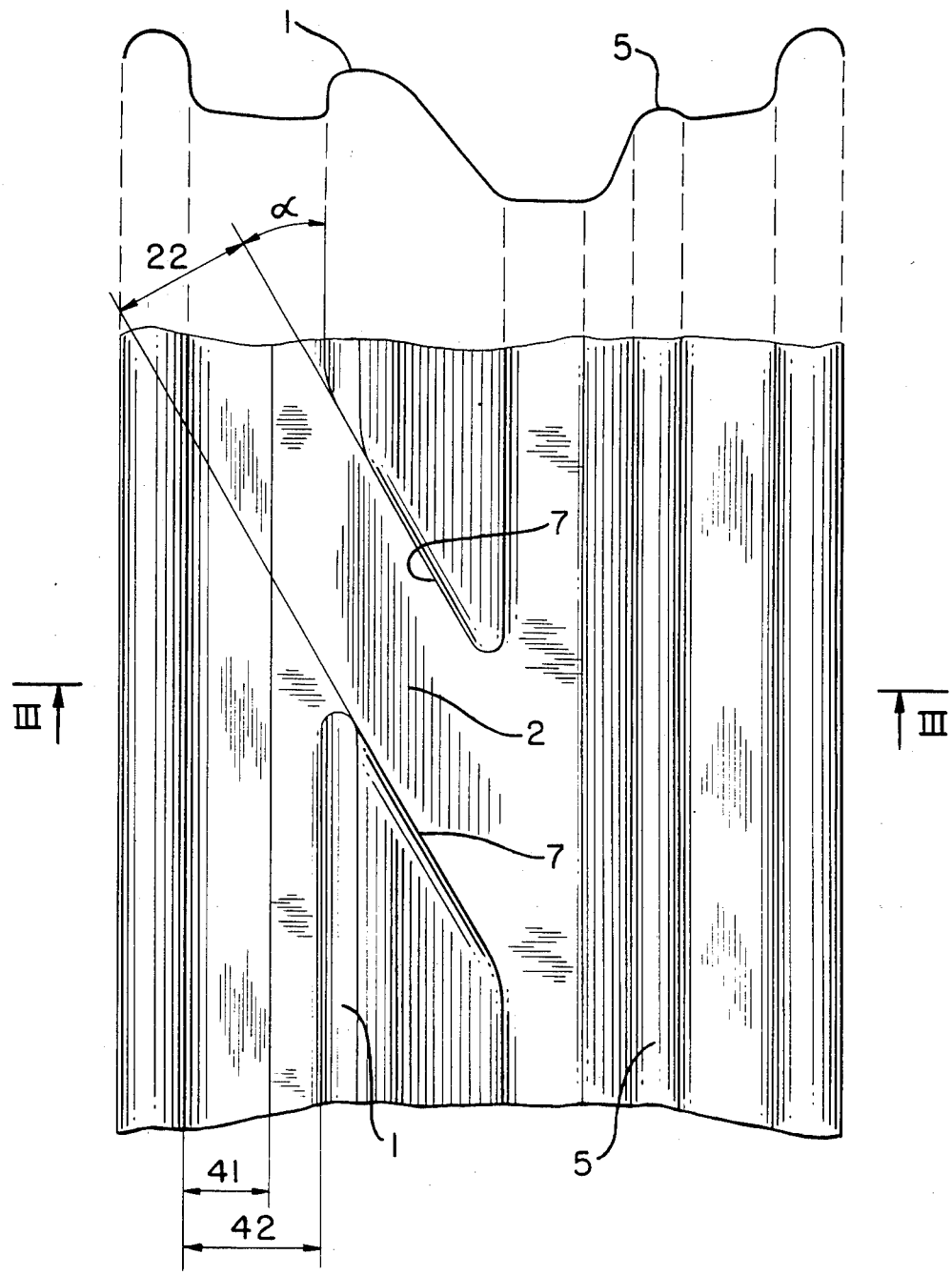
FIG. 2 is a view in elevation of a rim according to the invention, showing the notch.

In the figures there can be noted the stop 1 of great height 10, as well as the characteristic mounting notch 2. FIG. 3 shows a profile of a rim with a mounting well 3 having two seats 4 for the mounting of the tire beads, known per se. The hump 5 is one of the known types of necessarily small height 50. The rim flanges 6 are also of known shape.

The conicity γ of the seats 4 may be any whatsoever and is in any event independent of the invention.

Figure 1:
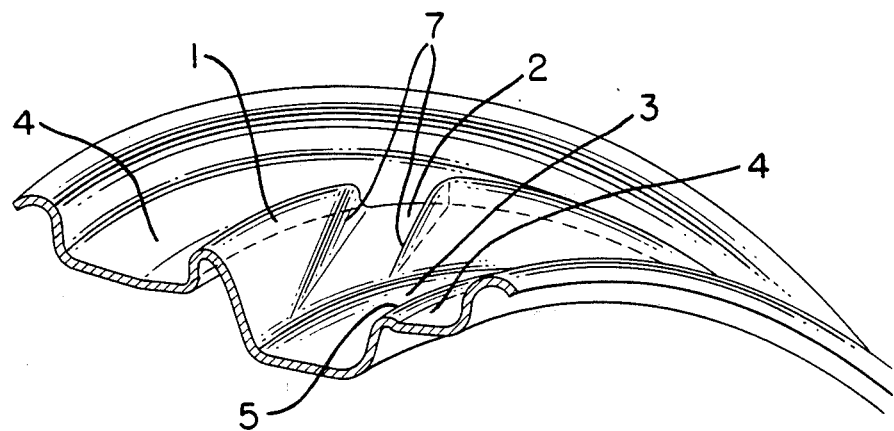
FIG. 1 is a perspective view of a rim according to the invention.

The section (FIG. 3), shown at the level of the mounting notch 2, clearly shows the stop 1 of great height 10. The width 41 of the seat is not a characteristic of the invention. Its value is dictated by the space taken up by the tire bead. The stop 1 is spaced from the rim flange 6 by a width 42 at least equal to the width 41 of the tire bead. Preferably the width 42 is greater than the width 41 in order to facilitate the mounting of the tire bead by permitting it to curve more gradually. The notch 2 has a width 22 at least equal to the width 41 of the tire bead. In order to fully understand the mechanism of mounting, reference should be had primarily to FIG. 1. The angle α which the notch 2 forms with the circumferential direction of the rim makes it possible to guide the tire bead from the mounting well 3 up to the seat 4. It can be selected within very wide limits, e.g., between 10° and 90°, preferably between 15° and 60°. However, the parameters 42, α, 22 cannot be selected independently of each other.

The angle α is a function of the widths 42 and 22. It is clear that the angle α must be small if one of these widths 42, 22 or both of them are close to their minimum value, i.e., the value of width 41.

Figure 4:
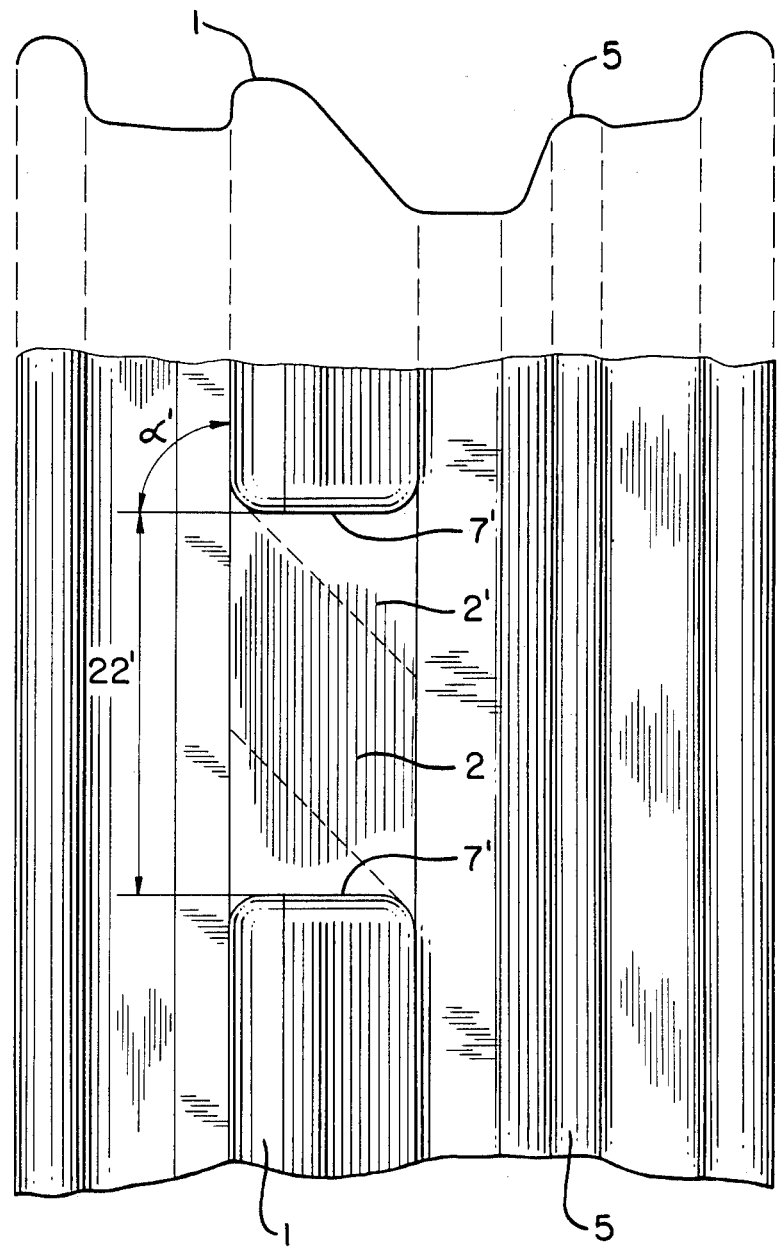
FIG. 4 is a view in elevation schematically showing another embodiment of the invention.

It is also clear that if α is close to 90°, the width 22 of the notch 2 must be much greater than the width 41 of the tire bead. Furthermore, the width 42 must possibly also be greater than the width 41, it being greater the smaller the width 22. In this connection, see FIG. 4 which shows that the notch 2' of width 22' may be of any configuration (for example α'=90°) provided that notch 2', is circumscribed on the notch 2, which is strictly necessary in order to permit the mounting. In particular, the outlines of the side faces 7' in a plan view may be very rounded.

As to the radius $R_e$ of the rim, measured at the place of the notch 2, it is always at most equal to the rim radius $R_s$ measured at the axially inner edge of the seat 4 and preferably changes gradually between the value of the rim radius $R_c$ measured at the mounting well 3 and the value of the rim radius $R_s$. Thus, $R_c \leq R_e \leq R_s$.

The side faces 7 of the mounting notch 2 may be radially parallel. They preferably diverge apart as one moves away from the axis of rotation of the wheel. It may be advantageous to incline the inwardly oriented side face 7 of the rim sufficiently so that the tire bead easily passes over the stop 1 for purposes of mounting.

The rim can be provided with one or two stops and notches in accordance with the invention.

In the event that a single stop having a notch is provided, it is preferably arranged, to be sure, on the outer side of the vehicle. The other side then may or may not be provided with a known hump.

The principle of the mounting of the tire on its seat makes it necessary to provide a special notch in the stop. However, without going beyond the scope of the present invention, several notches per stop can be provided. They are preferably arranged so as to effect a static balancing of the rim.

By way of illustration of the invention, the following table indicates a few heights 10 of stops 1 made on rims having an entirely conventional conicity γ of the seats 4 (5% in passenger cars, 15% in heavy vehicles).

| Diameter of rim | Minimum height (10) to prevent unwedging | Minimum height (10) up to which mounting is possible |
| --- | --- | --- |
| from 12" to 16" | 3 mm | 8 mm |
| from 17.5" to 19.5" | 6 mm | 12 mm |
| above 19.5" | 10 mm | 15 mm |

The last column sets forth the minimum height 10 up to which mounting is possible since, as this height depends somewhat on the type of tire, it may be even larger.

In another application, the invention also makes it possible to produce non-removable assemblies. The use of the notch 2 to screw the bead on its seat 4 permits a stop 1 of elevated height 10. Upon removal, this use is no longer possible under the same conditions and one is compelled to push the bead over the stop. For a rim of 12" to 16" in diameter, the minimum height 10 which assures non-removability of the tire is 6 mm. Accordingly, the invention also makes it possible to produce non-removable tire assemblies employing ordinary tires.

The invention applies to tire assemblies for two-wheelers, passenger cars, vans and heavy vehicles.

What is claimed is:

1. A rim for a vehicle wheel, of the single-piece type, having a mounting well located between two seats on each of which a tire bead is to be mounted, each seat being extended by a rim flange which extends radially and axially towards the outside of the rim, said rim being provided, between at least one of the two seats and the mounting well, with a stop for the axial retention of the tire bead spaced from the rim flange by a width at least equal to the width of the tire bead, said stop being provided with at least one notch, characterized by the fact that
   said notch has a width at least equal to the width of the tire bead, said notch is oriented at an angle α of between 10° and 90° with respect to the circumferential direction of the rim, and said notch is such that the rim radius measured at the outer surface of the rim at the place of the notch is always at most equal to the rim radius measured at the axially inner edge of the seat so that said notch can receive the tire bead and guide it from the mounting well up to its seat when the mounting is effected by relative rotation of the tire and the rim.

2. A rim according to claim 1, characterized by the fact that the angle α is between 15° and 60°.

3. A rim according to claim 1, characterized by the fact that the rim radius measured at the outer surface of the rim at the place of the notch changes gradually from the value of the rim radius measured at the mounting well up to the value of the rim radius measured at the axially inner edge of the seat.

4. A method of mounting a tire bead onto a seat of a rim, said rim being defined by any of claims 1 or 3, comprising the following steps:
   (a) engaging the bead on the notch and on the seat by utilizing the mounting well, as in for passing over a rim flange; and
   (b) relatively rotating the tire and the rim so that the tire bead gradually leaves the mounting well and places itself on its seat.

5. A tire and rim assembly consisting of a tire and a rim, said rim being a rim for a vehicle wheel, of the single-piece type, having a mounting well located between two seats on each of which a bead of the tire is mounted, each seat being extended by a rim flange which extends radially and axially towards the outside of the rim, said rim being provided, between at least one of the two seats and the mounting well, with a stop for the axial retention of the tire bead spaced from the rim flange by a width at least equal to the width of the tire bead, said stop being provided with at least one notch, said notch having a width at least equal to the width of the tire bead, said notch being oriented at an angle $\alpha$ of between 10° and 90° with respect to the circumferential direction of the rim, and said notch being such that the rim radius measured at the outer surface of the rim at the place of the notch is always at most equal to the rim radius measured at the axially inner edge of the seat so that said notch can receive the tire bead and guide it from the mounting well up to its seat when the mounting is effected by relative rotation of the tire and the rim.

6. A tire and rim assembly according to claim 5 wherein the angle $\alpha$ is between 15° and 60°.

7. A tire and rim assembly according to claim 5 wherein the rim radius measured at the outer surface of the rim at the place of the notch changes gradually from the value of the rim radius measured at the mounting well up to the value of the rim radius measured at the axially inner edge of the seat.

* * * * *

UNITED STATES PATENT AND TRADEMARK OFFICE
CERTIFICATE OF CORRECTION

PATENT NO. : 4,572,265
DATED : February 25, 1986
INVENTOR(S) : Claude Lescoffit

It is certified that error appears in the above-identified patent and that said Letters Patent is hereby corrected as shown below:

```
Col. 3, line 51, delete the comma (,) after "2'".
Col. 5, line 5, "claims 1 or 3" should read
-- claims 1 to 3 --.
```

Signed and Sealed this

Eighth Day of July 1986

[SEAL]

Attest:

DONALD J. QUIGG

Attesting Officer     Commissioner of Patents and Trademarks